Jan. 28, 1930. D. I. REITER 1,744,919

SNAP FASTENER SOCKET

Filed July 12, 1928

INVENTOR :
Daniel J. Reiter.
By Attorneys,
Fraser, Myers & Manley.

Patented Jan. 28, 1930

1,744,919

UNITED STATES PATENT OFFICE

DANIEL I. REITER, OF NEW YORK, N. Y.

SNAP-FASTENER SOCKET

Application filed July 12, 1928. Serial No. 292,220.

This invention relates to an improved snap fastener socket adapted for general application but particularly useful as a part of a rug fastener or other fastener intended to be subjected to the exacting conditions of unusually heavy service.

It is an object of the invention to provide a snap fastener socket which may be made from a single piece of metal and which may include a closed cup-like portion adapted to serve as a sounding element, a number of spaced attaching prongs, a channeled portion surrounding the cup-like portion, and a number of reinforcing fingers disposed in alternate relation with respect to said prongs, the device as a whole being rendered sufficiently resilient to receive and yieldingly hold an inserted stud by one or more cuts extending from the margin towards the center, so as to render the ring of material surrounding the cup-like portion discontinuous.

In the accompanying drawings illustrating modified forms of snap fastener sockets embodying the invention,—

Referring first to Figs. 1 to 4, inclusive, the invention is illustrated as embodied in a snap fastener socket member which in its preferred form may be made from a single disk of metal and may include a closed cup-like portion 21, a surrounding channeled portion 22 and a number of marginal attaching prongs 23 extending in spaced relation from the outer wall 24 of the channel.

Figure 3:
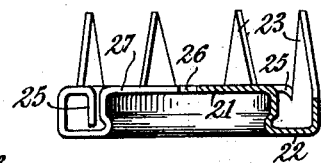
Fig. 3 is a view of the socket in cross-section along the line 3—3 of Fig. 2.

If desired, the outer wall of the channel 22 may be reinforced or stiffened by means of fingers 25, which may comprise parts of the disk from which the device is made, bent inwardly and downwardly to the base of the channel, as best indicated in Fig. 3. Such fingers may be disposed in alternate relation with respect to the prongs 23.

The socket member may be rendered sufficiently resilient to receive and yieldingly hold an inserted stud by severing the structure from its periphery towards the center. In the preferred form of the invention illustrated in Figs. 1 to 4, inclusive, the socket member is perforated at the center as at 26 and is severed from its periphery to said perforation by a radial cut 27, as best indicated in Fig. 2.

Figure 4:
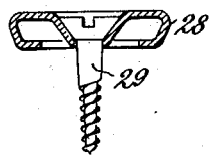
Fig. 4 is a conventional view of a stud adapted to be snapped into an engaging relation with the socket member illustrated in Figs. 1 to 3, inclusive.

The stud 28 diagrammatically indicated in Fig. 4 may be secured to the floor by means of a screw 29 or other appropriate fastening device, and the socket member may be secured to a rug or other floor covering by the spurs 23, which may be inserted in the material and bent down against the opposite surface or clinched therein by any suitable tool. The rug or floor covering, to which the socket is thus secured, may be held in place by applying the socket to the stud so as to cause the latter to be snapped into an engaging relation with the part of the structure immediately surrounding the cup-like portion 21.

It will be obvious that the socket member is adapted for general application and may be secured to articles of fabric, leather or other sheet material, and that it may be used with a stud element which may also be secured to leather, fabric or other sheet material by means of spurs or other appropriate attaching means.

In designing the above-described fastener, each part has been so positioned as to best serve its intended function. The prongs are well separated, thereby providing means whereby the socket may be firmly secured to the article on which it is intended to be used. Portions of the metal lying between the prongs have been made use of in the reinforcement of the marginal portion of the socket. The central portion of the disk is made use of as a sounding element adapted to produce a resonant click or snap as the socket is forced into engaging relation with an inserted stud. The closed top of the sounding element serves as a thumb-piece when applying the socket to the stud and prevents the soft material to which the socket may be secured from being forced into the stud-receiving recess and deadening the sound. This is a matter of some considerable importance since customers frequently regard a snap fastener as being inefficient or defective if a sharp snap or click is not produced when the stud and socket are forced into engagement with each other.

Figure 1:
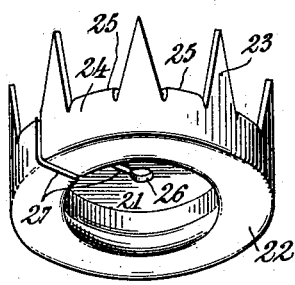
Figure 1 is a perspective view of a socket in which the invention is embodied in its preferred form.
Figure 2:
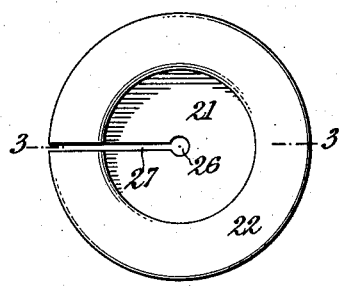
Fig. 2 is a face view of the socket illustrated in Fig. 1.
Figure 5:
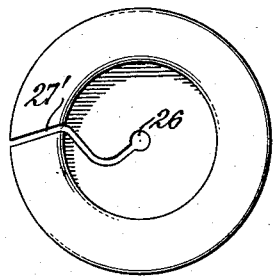
Fig. 5 is a face view of a socket embodying the invention in modified form.

In Fig. 5 is illustrated a modified form of the invention which differs from that illustrated in Figs. 1 to 3, inclusive, only in that the cut 27' from the perforation 26 to the periphery of the socket member is not radial but comprises a plurality of angular and curved portions as shown.

Figure 6:
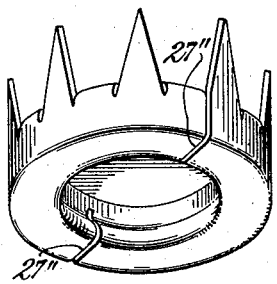
Fig. 6 is a perspective view of a second modified form of the invention.
Figure 7:
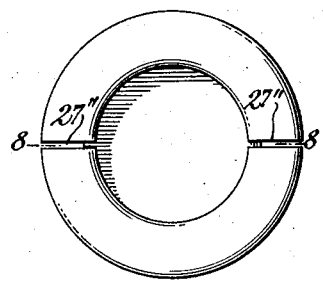
Fig. 7 is a face view of the socket illustrated in Fig. 6.
Figure 8:
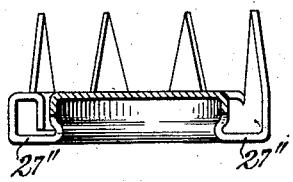
Fig. 8 is a cross-sectional view of the socket illustrated in Figs. 6 and 7, the section being taken along the line 8—8 of Fig. 7.

In the modified form of the invention illustrated in Figs. 6 to 8, inclusive, the socket member is rendered flexible by a plurality of cuts 27'', each of which may be radially disposed, as indicated in Fig. 7, and may extend from the periphery of the socket member to a point well within the rim of the cup-like portion, as best indicated in Figs. 6 and 8.

Other features of the modified forms of the invention illustrated in Figs. 5 to 8, inclusive, correspond with those of the preferred form and need not be specifically referred to.

The invention is not intended to be limited to the forms herein disclosed for purposes of illustration but should be regarded as covering modifications and variations thereof within the scope of the appended claims.

What is claimed is:

1. A snap fastener socket member made from a single piece of metal comprising a substantially closed, cupped, central, stud-receiving portion, adapted to serve as a thumb-piece, support, and sounding element, and spaced marginal prongs to serve as attaching elements, said member being cut from the periphery towards the center so as to render it resiliently expansible whereby it may receive and yieldingly hold an inserted stud.

2. A snap fastener socket member made from a single piece of metal comprising a substantially closed cupped, central, stud-receiving portion, adapted to serve as a thumb-piece, support, and sounding element, a surrounding channeled portion, and a plurality of attaching prongs extending in a spaced relation about the outer wall of said channeled portion, said member being cut from the periphery towards the center through the said channeled portion so as to render it resiliently expansible whereby it may receive and yieldingly hold an inserted stud.

3. A snap fastener socket member, as defined by claim 2, having fingers spaced in alternation with the attaching prongs and bent inwardly and downwardly to the base of the channel to serve as auxiliary supports.

4. A snap fastener socket member made from a single piece of metal comprising a substantially closed cupped, central, stud-receiving portion, adapted to serve as a thumb-piece, support, and sounding element, and spaced marginal prongs to serve as attaching elements, said member being severed by a single cut from the periphery to the center so as to render it resiliently expansible whereby it may receive and yieldingly hold an inserted stud.

5. A snap fastener socket member made from a single piece of metal comprising a substantially closed cupped, central, stud-receiving portion, adapted to serve as a thumb-piece, support, and sounding element, and spaced marginal prongs to serve as attaching elements, said member being severed by a single radial cut from the periphery to the center so as to render it resiliently expansible whereby it may receive and yieldingly hold an inserted stud.

6. A snap fastener socket member made from a single piece of metal comprising a substantially closed cupped, central, stud-receiving portion, adapted to serve as a thumb-piece, support, and sounding element, and spaced marginal prongs to serve as attaching elements, said member being perforated at the center and cut from the periphery to said perforation so as to render it resiliently expansible whereby it may receive and yieldingly hold an inserted stud.

In witness whereof, I have hereunto signed my name.

DANIEL I. REITER.